United States Patent [19]

Hermann

[11] 4,047,721
[45] Sept. 13, 1977

[54] DRIVE DEVICE WITH BELT AND STEPPED SPEED PULLEY

[75] Inventor: Hans Hermann, St. Georgen, Germany

[73] Assignee: Dual Gebruder Steidinger, St. Georgen, Black Forest, Germany

[21] Appl. No.: 677,736

[22] Filed: Apr. 16, 1976

[30] Foreign Application Priority Data

Apr. 19, 1975   Germany .............................. 2517395

[51] Int. Cl.$^2$ ........................... G11B 3/60; F16H 7/08
[52] U.S. Cl. .................................. 274/9 A; 74/242.3; 274/39 A
[58] Field of Search ........................... 274/9 A, 39 A; 74/242.3

[56] References Cited

U.S. PATENT DOCUMENTS

| 3,392,982 | 7/1968 | Thevenaz | 274/9 A |
| 3,570,318 | 3/1971 | Nakadaira | 74/242.3 |
| 3,838,859 | 10/1974 | Estkowski | 274/9 A |

Primary Examiner—Steven L. Stephan
Attorney, Agent, or Firm—Martin A. Farber

[57] ABSTRACT

A record player drive, comprising a belt pulley concentrically disposed relative to and connected with a turntable, a motor having a motor shaft containing sections of different diameters, and a drive belt connecting the belt pulley with the motor shaft. A guide fork shifts the belt on the sections, and an operating element stepwise sets different turntable-rotational speeds. A holder keeps the operating element in positions corresponding to drive rotational speeds of the turntable, and an elastic coupling is disposed between the guide fork and the operating element for exerting a shifting force on the guide fork when the operating element is moved with blocked guide fork in another drive position. A switch opens and closes the motor electric circuit, and a blocking device blocks the shifting movement of the guide fork, and is coupled with the switch such that with opened electric circuit the blocking is operative and with closed electric circuit is inoperative.

4 Claims, 1 Drawing Figure

U.S. Patent  Sept. 13, 1977  4,047,721
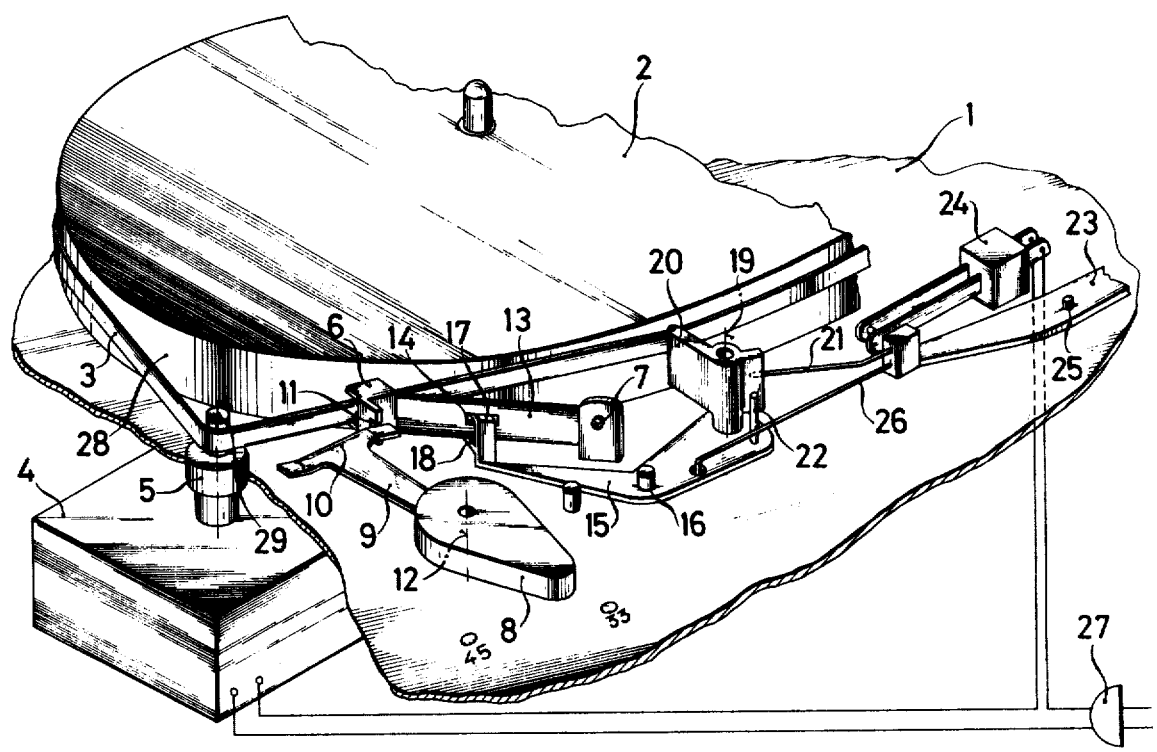

DRIVE DEVICE WITH BELT AND STEPPED SPEED PULLEY

The present invention relates to a drive device with a belt pulley and a stepped pulley, in general.

More particularly the invention relates to a drive device with a stepped pulley and a belt which is guidable selectively on one of the steps by means of a guide fork which is adjustable crosswise to the belt, and a device which locks the adjusting or shifting movement of the guide fork in dependency on the position of the current switch for the motor, particularly for the drive of a record player, the turntable of which is driven by means of a belt directly by the shaft of a motor.

During the laying around or transferring of the belt onto another step of the belt pulley, problems occur by excessive deformation and walloping, respectively, of the belt, which particularily is of significance when the belt is to be laid around or displaced also during the standstill or inoperative condition. The previously known devices go in various ways or directions in order to solve this problem.

One way resides in that the operating element for the position changing of the belt is simply blocked so long as the current switch for the motor stands in the off-position. Such a device is described in German Auslegeschrift No. 1218749. This method can lead to difficulties of handling or maintenance, because it compels the observation of the sequence of the operating steps.

With record players with a drive motor which is turned on by the swinging or pivotal movement of the tone arm, the operation would be made more difficult in the manner that the tone arm must be taken twice in the hand or a two hand operation would be required.

With the use for an automatic record player there resides further the disadvantage that the two switching steps must immediately follow one another if one does not want to put up with the fact that the beginning of the record is reproduced with a false rotational speed or at least not precisely correctly, since with the switching on of the motor the touch down movement of the tone arm also immediately begins.

Another way resides in that the position changing means for the belt is formed such that the belt is raised or lifted off from one of the steps by mere stretching or elongating, thus without walloping, and is placed on the other step, as this is illustrated for example in U.S. Pat. No. 3,555,917. Such a device is however expensive and requires a lot of space in height, so that it is not simple to be accomodated in a record player.

Accordingly it is an object and task of the present invention to provide a device of the introductory mentioned type where the operatability of the device is made easier and its applicability and useability is increased.

This task is solved in accordance with the present invention by providing a record player drive comprising a turntable with a belt concentrically disposed relative to and connected with the turntable and a motor having a motor shaft containing sections of different diameters. A drive belt connects the belt pulley with the motor shaft, and a guide fork means is provided for shifting the drive belt on the sections of different diameters of the motor shaft, the device further including an operating element means for stepwise setting different turntable-drive rotational speeds, means (e.g., 9, 10) for holding said operating element means in positions thereof corresponding to drive rotational speeds, respectively, of the turntable, means for blocking the shifting movement of said guide fork means, elastic coupling means disposed between said guide fork means and said operating element means for exerting a shifting force on said guide fork means when said operating element means is adjusted to a position with said guide fork means being blocked in another position corresponding to another drive rotational speed, switching means for opening and closing of a motor electric circuit, and said blocking means for being operatively coupled with said switching means for opening and closing of the motor electric circuit, such that with opened electric circuit the blocking is operative and with closed electric circuit the blockin is inoperative.

The known drive device of the introductory mentioned type has the disadvantage without the present invention that it fails or breaks down if the motor to be turned on is not connected to the power line or system, because by itself by the insertion or turning on, the blocking of the guide fork is neutralized, without requiring the belt in fact to run, which can easily occur with record players if they, for example, are placed for demonstration or exhibition by dealers without current-terminals or connections and the operating elements or the tone arm are moved by hand, which also is possible during home usage. The belt which then finds itself in walloping position for possibly longer time leads to deterioration of the reproduction.

A further embodiment of the present invention is based on the task, and it is also an object of the present invention to so provide, to make the functioning of the device for the care and maintenance of the belt, independent of the presence of a supply voltage.

It is yet another object of the present invention to solve the above-mentioned object by providing a device in accordance with the above-set forth record player drive comprising resilient coupling means operatively disposed between said switching means for opening and closing of the motor electric circuit and said means for blocking of the shifting movement of said guide fork means, the latter being formed with a stop means, said blocking means comprising a lever pivotally moveably disposed in a plane substantially parallel to said turntable, said lever has projection means for blocking the shifting movement of said guide fork means, said projection means cooperating with said stop means of said guide fork means for the blocking, an axle on said lever disposed substantially parallel to an axis of rotation of said turntable, said switching means for being moved in a sense of turning-on motor current and for operatively biasing said lever in a direction of movement in a sense corresponding thereto by said resilient coupling means, latch means rotatably mounted about said axle for pivoting in two positions and for being arranged such that said latch means is oriented in a first position crosswise to a direction of running of said belt, so that said latch means is biased so as to be braced against said belt when said lever is biased in a corresponding sense of movement of turning-on the motor current by said switching means, said lever is prevented from pivoting by means of said latch means braced against said belt, and in said first position said projection means of said lever is located in a blocking position thereof for blocking said guide fork means, said latch means for being oriented in a second positonsubstantially in the direction of running of said belt for not being braced against said belt and for thereby enabling a turning of said lever when the latter is moved in said corresponding sense of turning-on the motor current by said switching means, by which said projection means of said lever leaves said position blocking said guide fork means, and said latchmeans for moving from said first position to said second position by movement of said belt when said latch means is braced on said belt.

With the above and other objects in view the present invention will become more clearly understood from the following detailed description of a preferred embodiment of the present invention considered with the drawing of which the only FIGURE illustrates a perspective view of a drive device with belt pulley and stepped speed pully in accordance with the present invention, with the turntable and base plate being shown partially broken away.

Referring now to the drawing, a cutout of a record player base plate 1 is illustrated with the drive device of the invention. A turntable 2 is rotatably mounted on the base plate 1, the turntable 2 simultaneously serving as a belt pulley 28 which is concentric to the turntable 2 and connected therewith and is driven by means of a belt 3 from a motor 4, the latter carrying on its shaft a two-stepped belt pulley5, 29. The belt 3 is selectively directable or guideable onto one of the two steps 5, 29 of the two stepped belt pulley 5, 29 by means of a guide fork 6, the latter being pivotally mounted about a transverse axle 7 carried by a bearing arm 13. The guide fork 6 is shiftable by means of an operating element 8 for setting the rotational speed to 33 and 45 revolutions per minute, in the manner that an arm 9 which is connected with the operating element 8 engages with an inclined slide surface 10 on its end in a slot 11 of the guide fork 6, so that during turning or twisting the operating element 8 about its axis 12, the guide fork 6 is raised or lowered, respectively. A blocking lever 15 is rotatably mounted about an axle 16 which is parallel to the axis of rotation of the turntable 2, the blocking lever 15 being rotatable in a plane parallel to the turntable 2. The blocking lever 15 carries two projections 17, 18 on one end thereof, with which projections the arm is enabled to engage in a recess 14 of the bearing arm 13 of the guide fork 6 in order to hold or keep the guide fork 6 in the positions corresponding to the belt steps. The recess 14 constitutes a stop or detent means for operatively cooperating with the projections 17, 18, respectively, for blocking the movement of the bearing arm 13 and thus the guide fork 6. At the other end, the locking lever 15 carries a latch 20 which is rotatable about an axle 19 also thereon, the latch 20 being held against an abutment or limit stop 22 by means of a spring 21 in a first position of the latch 20 with the latter being directed perpendicularly toward the circumference of the turntable 2. A starting lever 23 for actuation of the motor switch 24 (for opening and closing of the motor electric circuit) is rotatably mounted about an axle 25 and carries on one end thereof the previously mentioned spring 21 and an additional spring 26 (constitutinga resilient coupling means) for actuation of the blocking or locking lever 15.

The drive device is illustrated in the drawing with the motor current turned off, i.e., in the condition of an opened motor electric circuit. If the operating element 8 is moved for setting the drive rotational speed into the position "45", the arm 9 indeedthus attempts to press the guide fork 6 downwardly with the cooperation of the inclined slide surface 10 of the arm 9. The guide fork 6 however is held in its illustrated position by means of the locking lever 15 so that the arm 9 is elastically or resiliently guided or moved upwardly, the arm 9, constituting a coupling means between the operating element 8 and the guide fork 6, being made of a suitable material to permit this elastic, flexible or springymovement of the arm 9.

The operating element 8 remains in the set position 45 and the drive belt 3, in its illustrated position, which corresponds to 33. If the starting lever 23 is actuated by turning or twisting same in the clockwise sense, the motor switch 24 becomes closed. Simultaneously, the spring 26 of the starting lever 23 attempts to swing or turn the locking lever 15 against the clockwise sense into its ineffective or inoperative position. This, however, is first of all initially not possible, since the latch 20 prevents a swinging of the blocking lever 15 in the manner that the latch 20 is biased so as to be braced or wedged abuttingly crosswise or perpendicularly against the belt 3 and the turntable 2-belt pulley 28, respectively, (constituting the first position of the latch 200 when the lever 15 is at most slightly moved, if not at all moved by the starting lever 23 via the spring 26 in a sense of closing the contacts of the motor switch 24. The latch 20 can be arranged such that it is initially in the abutting perpendicular bracing position against the belt 3 and turntable 2 without any slight movement of the blocking lever 15 upon the above-mentioned actuation of the starting lever 23.

Fist only when the power plug 27 is threafter connected with the line or power system, so that the belt 3 in fact actually runs, ddoes the latch 20 thereby swing opposite to the clockwise sense (i.e., the latch 20 then being in a second position substantially in the direction of the running of the belt 3) and releases the blocking lever 15 by enabling the latter to pivot counter-clockwise to release the projection 17 from the recess 14, such that the guide fork 6, which guide fork 6 stands under the biasing or pressing action of the arm 9 which is connected with the operating element 8, can guide the belt 3 onto the other step 5 of the belt pulley 5, 29.

If the starting lever 23 is swung back into its initial position so that the motor switch 24 is opened, the blocking lever 15 is pivoted into its operative or effective position and secures the guide fork 6 in its lower position, in the manner than the projection 18 engages in the recess 14. With the swinging back of the starting lever 23, the spring 21 connected therewith also returns the latch 20 therewith again into its illustrated initial position.

Herein the starting lever 23 and the motor switch 24 and the parts appurtenant thereto constitute a switching means.

While I have disclosed one embodiment of the present invention, it is to be understood that this embodiment is given by example only and not in a limiting sense.

I claim:
1. A record player drive, comprising
  a turntable,
  a belt pulley concentrically disposed relative to and connected with said turntable,
  a motor having a motor shaft containing sections of different diameters,
  a drive belt connecting said belt pulley with said motor shaft,
  a guide fork means for shifting said drive belt on said sections of different diameter of said motor shaft,
  an operating element means for adjustment into different setting positions each corresponding to a specific turntable drive rotational speed and for being held in said positions thereof, respectively, means for blocking the shifting movement of said guide fork means, said blocking means is operatively independent from said operating element means, elastic coupling means disposed between said guide fork means and said operating element means for exerting a shifting force on said guide fork means when said operating element means is adjusted to one of said positions corresponding to one drive rotational speed when said guide fork means is blocked in another position corresponding to another drive rotational speed, switching means for opening and closing of a motor electric circuit, said blocking means being operatively coupled with said switching means for opening and closing of the motor electric circuit, such that with opened electric circuit the blocking is operative and with closed electric circuit the blocking is inoperative.

2. The device as set forth in claim 1, wherein said switching means for opening and closing the motor current is actuatable independently from said operating element means.

3. A record player drive, comprising a turntable, a belt pulley concentrically disposed relative to and connected with said turntable, a motor having a motor shaft containing sections of different diameters, a drive belt connecting said belt pulley with said motor shaft, a guide fork means for shifting said drive belt on said sections of different diameter of said motor shaft, an operating element means for adjustment into different setting positions each corresponding to a specific turntable drive rotational speed, means for holding said operating element means in said positions thereof corresponding to the drive rotational speeds, respectively, of said turntable, means for blocking the shifting movement of said guide fork means, elastic coupling means disposed between said guide fork means and said operating element means for exerting a shifting force on said guide fork means when said operating element means is adjusted to a position with said guide fork means being blocked in another position corresponding to another drive rotational speed, switching means for opening and closing of a motor electric circuit, said blocking means being operatively coupled with said switching means for opening and closing of the motor electric circuit, such that with opened electric circuit the blocking is operative and with closed electric circuit the blocking is inoperative.

resilient coupling means operatively disposed between said switching means for opening and closing of the motor electric circuit and said guide means for blocking of the shifting movement of said guide fork means, the latter being formed with a stop means, said blocking means comprises a lever pivotally moveably disposed in a plane substantially parallel to said turntable, said lever has projections means for blocking the shifting movement of said guide fork means, said projection means cooperating with said stop means of said guide fork means for the blocking, an axle on said lever disposed substantially parallel to an axis of rotation of said turntable, said switching means for being moved in a sense of turning-on motor current and for operatively biasing said lever in a direction of movement in a sense corresponding thereto by said resilient coupling means, latch means rotatably mounted about said axle for pivoting in two positions and for being arranged such that said latch means is oriented in a first portion crosswise to a direction of running of said belt, so that said latch means is biased so as to be braced against said belt when said lever is biased in a corresponding sense of movement of turning-on the motor current by said switching means, said lever is prevented from pivoting by means of said latch means braced against said belt, and in said first position said projection means of said lever is located in a blocking position thereof for blocking said guide fork means, said latch means for being oriented in a second position substantially in the direction of running of said belt for not being braced against said belt and for thereby enabling a turning of said lever when the latter is moved in said corresponding sense of turning-on the motor current by said switching means, by which said projection means of said lever leaves said position blocking said guide fork means, and said latch means for moving from said first position to said second position by movement of said belt when said latch means is braced on said belt.

4. The device as set forth in claim 3, further comprising an abutment disposed on said lever, spring means operatively connected between said switching means and said latch means for biasing said latch means in said first position with said latch means being held thereby against said abutment, said latch means for pivoting in a direction away from said abutment against the biasing of said spring means by the movement of said belt.

* * * * *